United States Patent
Fjellstad et al.

(10) Patent No.: US 8,902,353 B2
(45) Date of Patent: Dec. 2, 2014

(54) IMAGING READER WITH INDEPENDENTLY CONTROLLED ILLUMINATION RATE

(75) Inventors: Christopher Fjellstad, Smithtown, NY (US); Christopher Warren Brock, Manorville, NY (US); Thomas Lackemann, Sayville, NY (US); Robert Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 655 days.

(21) Appl. No.: 13/106,378

(22) Filed: May 12, 2011

(65) Prior Publication Data

US 2012/0287332 A1    Nov. 15, 2012

(51) Int. Cl.
*H04N 5/235* (2006.01)
*H04N 5/222* (2006.01)
*G03B 7/08* (2014.01)
*G06K 7/10* (2006.01)

(52) U.S. Cl.
CPC .................................. *G06K 7/10732* (2013.01)
USPC ....................... 348/362; 348/371; 235/462.24

(58) Field of Classification Search
CPC ..................... G06K 7/10732; G06K 7/10752
USPC ............. 348/294, 362, 371; 235/454, 462.01, 235/462.24, 462.42, 462.45
See application file for complete search history.

(56) References Cited

U.S. PATENT DOCUMENTS

| | | | |
|---|---|---|---|
| 2005/0103979 A1* | 5/2005 | Heigel | 250/208.1 |
| 2006/0113386 A1 | 6/2006 | Olmstead | |
| 2006/0118627 A1 | 6/2006 | Joseph et al. | |
| 2006/0202036 A1* | 9/2006 | Wang et al. | 235/462.07 |
| 2010/0165160 A1 | 7/2010 | Olmstead et al. | |

OTHER PUBLICATIONS

International Search Report and Written Opinion for International Patent Application No. PCT/US2012/037043 mailed on Aug. 21, 2012.

* cited by examiner

*Primary Examiner* — Trung Diep

(57) ABSTRACT

An imaging module for electro-optically imaging a target, includes an energizable illuminating light source for illuminating the target with illumination light for return from the target, an energizable solid-state imager for capturing return light from the target, and a controller for energizing the imager during an exposure time period to capture the return light at a frame rate, for deenergizing the imager during a non-exposed time period, and for energizing the illuminating light source not only during the exposure time period, but also during the non-exposed time period, to produce a plurality of illumination light pulses at an illumination rate that enables the human eye to perceive the illumination light pulses as substantially continuous. The illumination rate of one or more of the illumination light pulses produced during the non-exposed time period is substantially independent and decoupled from the frame rate.

17 Claims, 3 Drawing Sheets

0
IMAGING READER WITH INDEPENDENTLY CONTROLLED ILLUMINATION RATE

DESCRIPTION OF THE RELATED ART

Solid-state imaging systems or imaging readers have been used, in both handheld and/or hands-free modes of operation, to image various targets, such as bar code symbols to be electro-optically decoded and read, particularly one-dimensional bar code symbols, such as the Universal Product Code (UPC) symbology having a row of bars and spaces spaced apart along a linear direction, as well as two-dimensional symbols, such as the Code 49 symbology having a plurality of vertically stacked rows of bar and space patterns in a single symbol, and non-symbol targets, such as documents, drivers' licenses, signatures, etc., to be processed for storage or display.

The known imaging reader includes a housing either held by an operator and/or supported on a support surface, a window supported by the housing and aimed at the target during imaging, and an imaging engine or module supported by the housing. The imaging module includes a solid-state imager with a sensor array of photocells or light sensors that correspond to image elements or pixels in a field of view of the imager, and an imaging lens assembly for capturing return light scattered and/or reflected from the target being imaged along an imaging axis through the window, and for projecting the return light onto the sensor array to initiate capture of an image of the target during an exposure time period. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are processed by a programmed microprocessor or controller into data indicative of the symbol being decoded and read, or into a picture of the target.

It is therefore known to use the imager for capturing a monochrome image of a target or symbol and to use the imager with multiple buried channels for capturing a full color image of the target or symbol. It is common to provide a two-dimensional CCD with a 640×480 pixel resolution commonly found in VGA monitors, although other resolution sizes, especially of megapixel size, are now being made available for use. The typical CCD array operates at a frame rate of about 15-60 frames per second (or Hz) to acquire the entire target image. Each frame is a unique, consecutive image acquired by the CCD array. The typical CCD array has a global shutter operable at an exposure rate corresponding to the frame rate so that each captured image will not be disturbed by motion of the target relative to the window during the exposure time period.

In order to increase the amount of the return light captured by the sensor array, especially in dimly lit environments and/or at far range reading, an illuminating light assembly is provided for illuminating the target with illumination light from an illuminating light source, e.g., one or more light emitting diodes (LEDs) and illuminating lenses, through the window for reflection and scattering from the target. The illumination light can be constant and continuous, or, to save electrical power and heat buildup, the illuminating light source can be pulsed by the controller to produce illumination pulses at an illumination rate that is synchronized to the frame rate. For example, if the array operates at a frame rate of about 15-30 frames per second, then the illumination rate is also about 15-30 illumination pulses per second.

Although the known imaging reader is generally satisfactory for its intended purpose, bright illumination pulses shining out of the window, especially at pulse rates below 50-60 pulses per second, can be annoying or uncomfortable to the operator, or to a consumer standing nearby the reader. Also, the synchronization between the frame rate and the illumination rate can cause problems under certain operating conditions. For example, the CCD array can sometimes operate at low frame rates when a longer exposure time period is desired, or when slower video modes are required. Such low frame rates cause correspondingly synchronized low illumination rates, thereby producing the aforementioned annoying illumination pulses. Also, sometimes, it is desirable to reduce the frame rate, especially for newer megapixel sensor arrays, but it is undesirable to automatically reduce the illumination rate. In addition, sometimes the CCD array in an auto-exposure mode has a frame rate that varies, in which case, it can happen that if the frame rate varies too low, then the illumination rate can be reduced to the extent that, again, the aforementioned annoying illumination pulses are produced.

Accordingly, it would be desirable to substantially decouple the illumination and frame rates so that a reduction in the frame rate will not automatically lower the illumination rate to the point where annoying illumination pulses are generated, to produce illumination that is not perceived by the human eye as flashing, and to produce illumination pulses at a consistently high illumination rate regardless of the frame rate and the exposure rate of the sensor array in an imaging reader.

SUMMARY OF THE INVENTION

The present invention relates to an imaging reader for electro-optically imaging a target, e.g., a symbol to be decoded and read. The reader includes a housing, a light-transmissive window, and an imaging engine or module mounted in the housing for capturing return light from the target through the window. The imaging module includes an image capture assembly having a solid-state imager with a sensor array of photocells or light sensors, e.g., a CCD or CMOS device, and an imaging lens assembly for capturing and projecting the return light onto the sensor array to initiate capture of an image of the target during an exposure time period. The imaging module also includes an illuminating light assembly for illuminating the target through the window with illumination light from an illuminating light source, e.g., one or more light emitting diodes (LEDs) and illuminating lenses, for reflection and scattering from the target. A programmed microprocessor or controller not only controls the imager and the illuminating light source, but also processes the captured light into data indicative of the symbol being decoded and read, or into a picture of the non-symbol target.

In accordance with one aspect of this invention, the controller is further operative for energizing the imager during the exposure time period to capture the return light at a frame rate, for deenergizing the imager during a non-exposed time period, and for energizing the illuminating light source not only during the exposure time period, but also during the non-exposed time period, to produce a plurality of illumination light pulses at an illumination rate that enables the human eye to perceive the illumination light pulses as substantially continuous, typically at least fifty illumination light pulses per second. The illumination rate of one or more of the illumination light pulses produced during the non-exposed time period is substantially independent and decoupled from the frame rate. The frame and illumination rates are no longer synchronized and coupled together as in the prior art. The illumination rate is preferably greater than the frame rate.

Still another feature of the present invention resides in a method of electro-optically imaging a target, and is performed by illuminating the target with illumination light from an energizable illuminating light source for return from the target, capturing return light from the target with an energizable solid-state imager, energizing the imager during an exposure time period to capture the return light at a frame rate, deenergizing the imager during a non-exposed time period, and energizing the illuminating light source not only during the exposure time period, but also during the non-exposed time period, to produce a plurality of illumination light pulses at an illumination rate that enables the human eye to perceive the illumination light pulses as substantially continuous. The illumination rate of the one or more of the illumination light pulses produced during the non-exposed time period is substantially independent and decoupled from the frame rate.

Thus, the illumination and frame rates are independently controlled. A reduction in the frame rate will not automatically lower the illumination rate to the point where annoying illumination pulses are generated. The illumination that is produced is not perceived by the human eye as flashing. The illumination pulses are thus produced at a consistently high illumination rate regardless of the frame rate and the exposure rate of the sensor array in the imaging reader.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
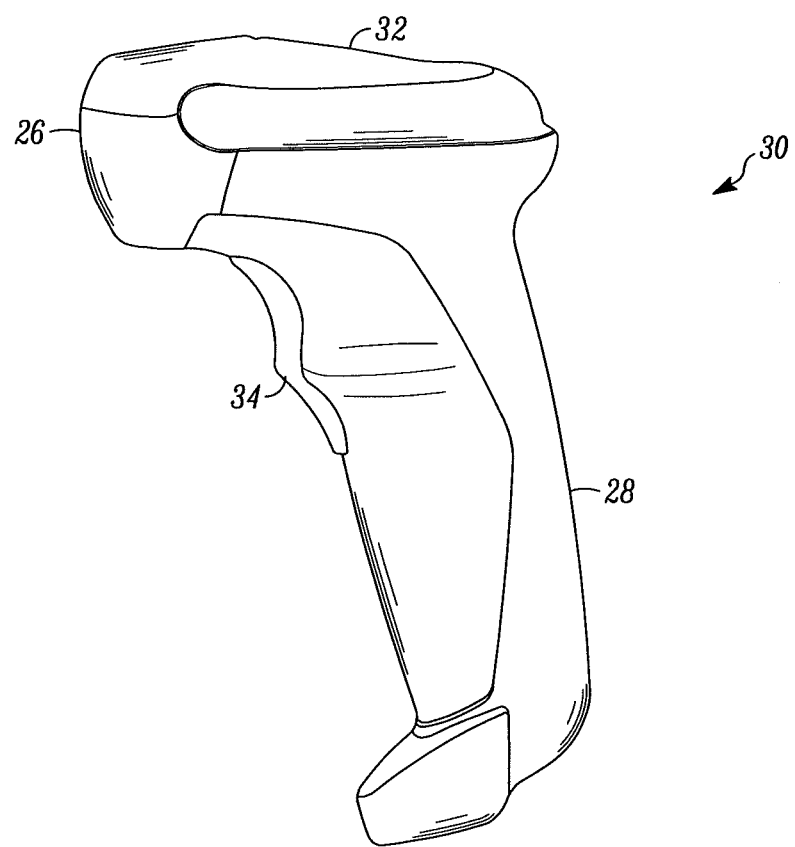
FIG. 1 is a side elevational view of a portable imaging reader operative for electro-optically imaging a target or symbol that can benefit from and use this invention.

Reference numeral 30 in FIG. 1 generally identifies an ergonomic imaging reader configured as a gun-shaped housing having an upper housing part 32 and a lower housing part 28 that includes a handle tilted rearwardly away from the upper housing part 32 at an angle of inclination, for example, fifteen degrees, relative to the vertical. A window 26 is located adjacent the front or nose of the upper housing part 32. The imaging reader 30 is held in an operator's hand and used in a handheld mode in which a trigger 34 is manually depressed to initiate imaging of a target or symbol, especially one- and two-dimensional symbols, to be read in a range of working distances relative to the window 26. Housings of other configurations can also be employed and operated in other modes, such as a hands-free mode of operation, by being supported on a countertop or like support surface.

Figure 2:
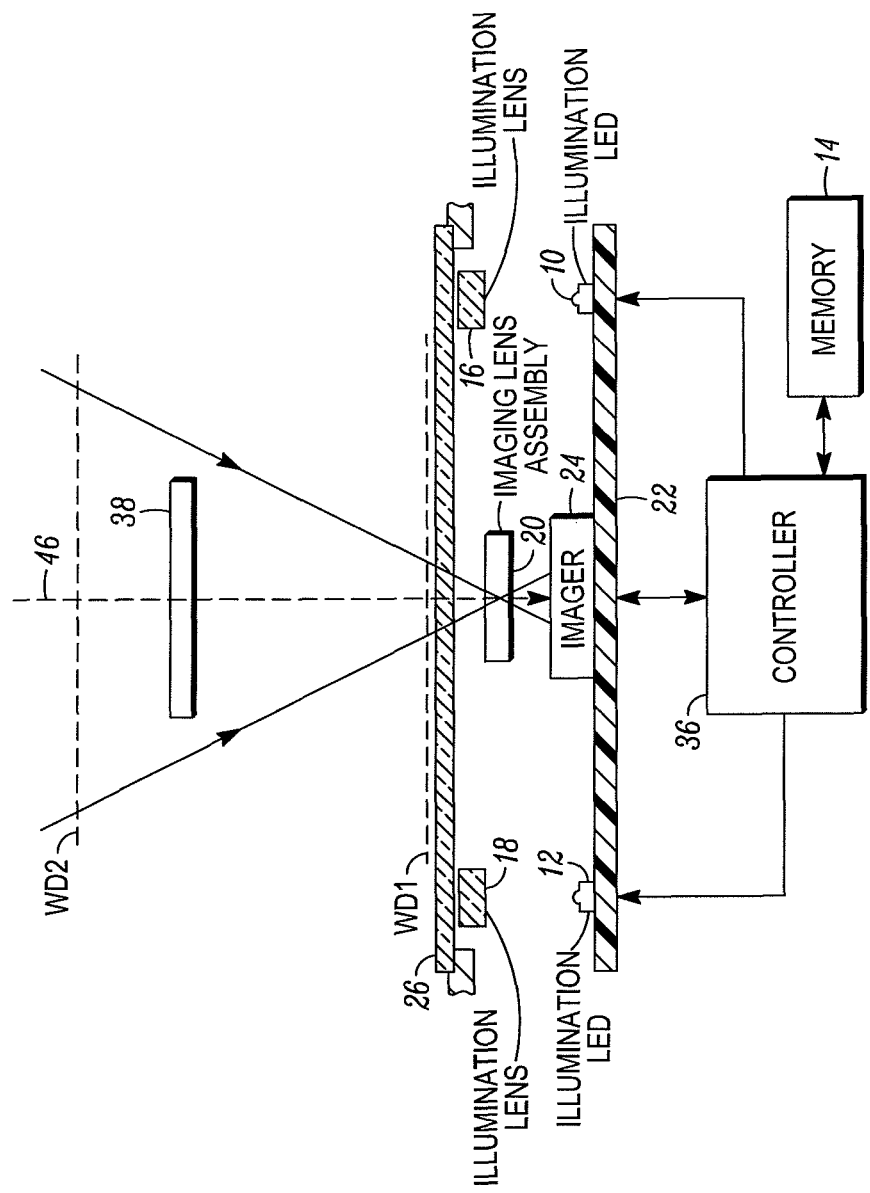
FIG. 2 is a schematic diagram of various components of the reader of FIG. 1.

As schematically shown in FIG. 2, an imaging engine or module is mounted in the reader 30. The imaging module includes an image capture assembly having a solid-state imager 24, for example, a CCD or a CMOS device mounted on a printed circuit board (PCB) 22. The imager 24 has a one- or two-dimensional array of addressable image sensors operative for detecting return light captured by an imaging lens assembly 20 along an imaging axis 46 through the window 26 over a field of view, and for producing electrical signals corresponding to a one- or two-dimensional array of pixel data over the field of view. The return light is scattered and/or reflected from a target or symbol 38 over the field of view. The imaging lens assembly 20, e.g., a Cooke triplet, is operative for focusing the return light onto the array of image sensors to enable the target 38 to be imaged.

The target 38 may be located anywhere in a working range of distances between a close-in working distance (WD1) and a far-out working distance (WD2). In a preferred embodiment, WD1 is about one-half inch from the window 26, and WD2 is about thirty inches from the window 26. The imaging lens assembly 20 is preferably located in a close confronting relationship with the window 26, for example, no more than a few millimeters away.

An illuminating light assembly is also mounted in the reader 30, and includes an illumination light source, e.g., at least one light emitting diode (LED), and preferably a plurality of LEDs, such as a pair of illumination LEDs 10, 12 mounted on the PCB 22, and a pair of illumination lenses 16, 18 for shaping the illumination light emitted by the illumination LEDs 10, 12. At least part of the scattered and/or reflected return light is derived from the illumination of light on and along the target 38. The illuminating light assembly is preferably located in a close confronting relationship with the window 26, for example, no more than a few millimeters away.

As also shown in FIG. 2, the imager 24 and the LEDs 10, 12 are operatively connected to a controller or programmed microprocessor 36 operative for controlling the operation of these components. A memory 14 is connected and accessible to the controller 36. Preferably, the microprocessor 36 is also used for processing the electrical signals from the imager 24 and for processing and decoding the captured target images. The controller 36 and the memory 14 may advantageously be mounted on the PCB 22.

In operation, the microprocessor 36 sends a command signal for energizing the imager 24 to capture the return light at a frame rate, e.g., about 30-60 frames per second, and at a corresponding exposure rate, and a separate command signal for independently energizing each illuminating light source 10, 12 to produce illumination light pulses at an illumination rate, e.g., about at least fifty, and preferably sixty, illumination light pulses per second. The frame rate, or frame frequency, is the frequency at which the imager 24 produces unique consecutive target images called frames. The illumination rate, or illumination frequency, is the frequency at which the illumination light pulses are generated. By way of example, the frame rate can be about 30 frames per second or Hz, and the illumination rate can be about 60 pulses per second or Hz.

In accordance with this invention, the controller 36 is further operative for energizing the imager 24 during the exposure time period to capture the return light at the frame rate, for deenergizing the imager 24 during a non-exposed time period, and for energizing the illuminating light source 10, 12 not only during the exposure time period, but also during the non-exposed time period, to produce a plurality of illumination light pulses at an illumination rate that enables the human eye to perceive the illumination light pulses as substantially continuous, typically at least fifty illumination light pulses per second.

Figure 3:
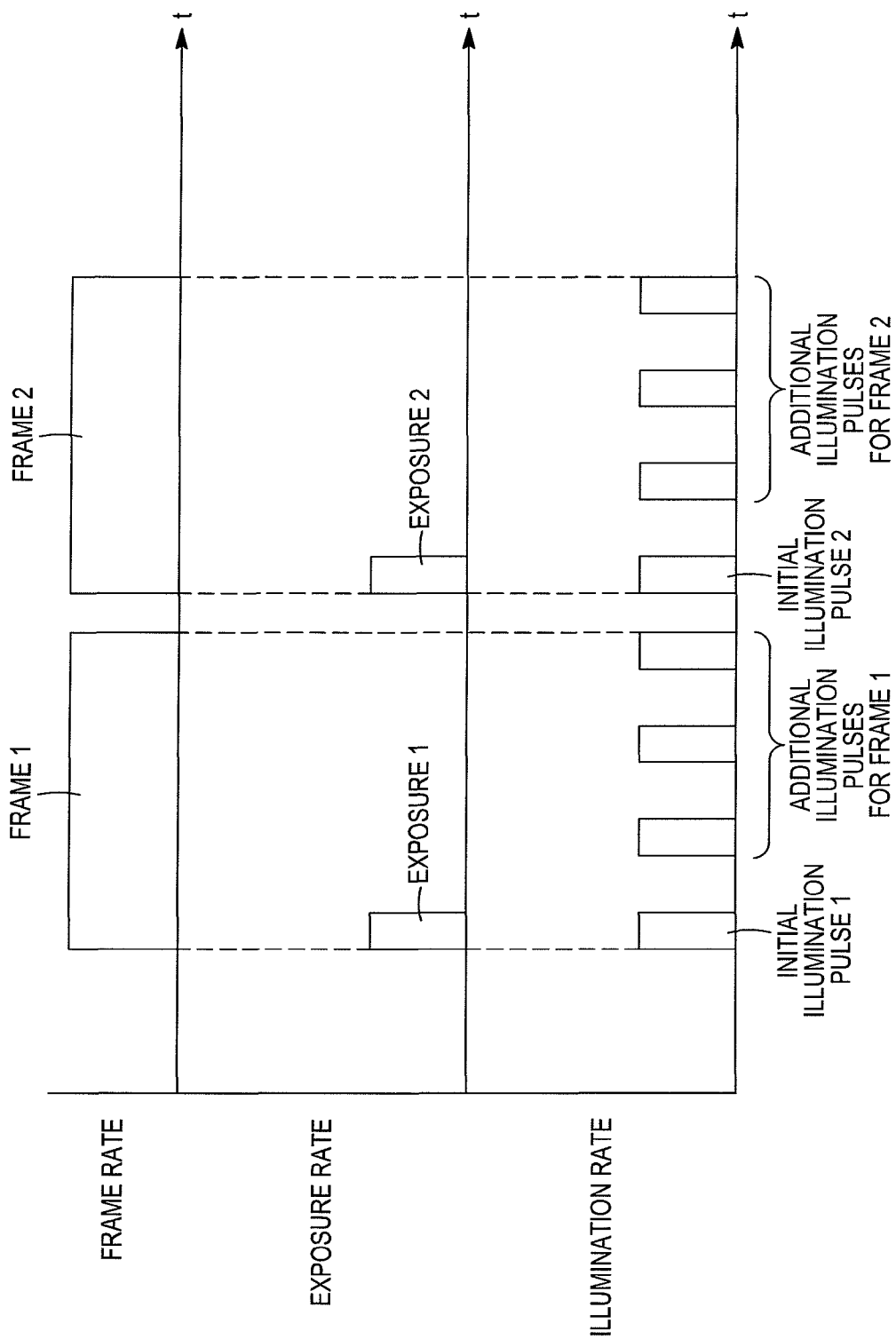
FIG. 3 is a graph depicting frame, exposure and illumination rates of various components of the reader of FIG. 1.

FIG. 3 shows the frame rate as exemplified by successive frames 1 and 2, the exposure rate as exemplified by successive exposure time periods or exposures 1 and 2, and the illumination rate as exemplified by an initial illumination light pulse produced for each frame during the exposure time period, and by one or more additional illumination light pulses produced for each frame during the non-exposed time period. The initial illumination pulse associated with each frame is largely synchronous with the exposure time period of each frame. Thus, while the imager 24 is exposed and collecting light, the initial illumination light pulse provides the light to be subsequently collected.

This invention proposes to add the one or more additional illumination light pulses when the imager 24 is not being exposed. Although four additional illumination light pulses are illustrated in FIG. 3, this number is merely exemplary. Thus, all the illumination light pulses are produced at an illumination rate sufficiently high so that all the illumination light pulses tend to blend together and mask the flicker or flashing effect of the lower frequency frame rate. The rate of these one or more additional illumination light pulses produced during the non-exposed time period is substantially independent and decoupled from the frame rate. The frame and illumination rates are no longer synchronized and coupled together as in the prior art. The illumination rate is preferably greater than the frame rate.

It will be understood that each of the elements described above, or two or more together, also may find a useful application in other types of constructions differing from the types described above.

While the invention has been illustrated and described as an imaging reader with an independently controlled illumination rate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging module for electro-optically imaging a target, comprising:
    an illuminating light assembly including an energizable illuminating light source for illuminating the target with illumination light for return from the target;
    an image capture assembly including an energizable solid-state imager for capturing return light from the target;
    a controller for energizing the imager during an exposure time period to capture the return light at a frame rate, for deenergizing the imager during a non-exposed time period, and for energizing the illuminating light source in the maging module not only during the exposure time period, but also during the non-exposed time period, to produce a plurality of illumination light pulses at an illumination rate that enables the human eye to perceive the illumination light pulses as substantially continuous, the illumination rate of at least one said illumination light pulse produced during the non-exposed time period being substantially independent and decoupled from the frame rate; and
    wherein the controller energizes the illuminating light source during the exposure time period to generate an initial illumination light pulse, and wherein the controller energizes the illuminating light source during the non-exposure time period as at least one additional illumination light pulse that successively follows the initial illumination light pulse, wherein both the rising edge and falling edge of the at least one additional illumination light pulse is within said non-exposure time period that is between the exposure time period to generate the initial illumination light pulse and the next exposure time period.

2. The imaging module of claim 1, wherein the illuminating light assembly includes an illuminating lens for directing the illumination light pulses to the target for reflection and scattering from the target.

3. The imaging module of claim 1, wherein the illuminating light assembly includes another energizable illuminating light source for illuminating the target, and wherein the controller is operative for energizing both illuminating light sources to produce the illumination light pulses.

4. The imaging module of claim 1, wherein the image capture assembly includes an imaging lens for capturing the return light, and for projecting the return light onto the imager to initiate capture of an image of the target.

5. The imaging module of claim 1, wherein the illumination rate produced by the controller is at least fifty illumination light pulses per second.

6. The imaging module of claim 1, wherein the frame rate produced by the controller is less than sixty frames per second, and wherein the illumination rate produced by the controller is greater than the frame rate.

7. An imaging reader for electro-optically imaging a target, comprising:
    a housing having a light-transmissive window facing the target; and
    an imaging module supported by the housing and including
        an illuminating light assembly including an energizable illuminating light source for illuminating the target through the window with illumination light for return from the target,
        an image capture assembly including an energizable solid-state imager for capturing return light through the window from the target,
        a controller for energizing the imager during an exposure time period to capture the return light at a frame rate, for deenergizing the imager during a non-exposed time period, and for energizing the illuminating light source in the maging module not only during the exposure time period, but also during the non-exposed time period, to produce a plurality of illumination light pulses at an illumination rate that enables the human eye to perceive the illumination light pulses as substantially continuous, the illumination rate of at least one said illumination light pulse produced during the non-exposed time period being substantially independent and decoupled from the frame rate, and
    wherein the controller energizes the illuminating light source during the exposure time period to generate an initial illumination light pulse, and wherein the controller energizes the illuminating light source during the non-exposure time period as at least one additional illumination light pulse that successively follows the initial illumination light pulse, wherein both the rising edge and falling edge of the at least one additional illumination light pulse is within said non-exposure time period that is between the exposure time period to generate the initial illumination light pulse and the next exposure time period.

8. The imaging reader of claim 7, wherein the illuminating light assembly includes an illuminating lens for directing the illumination light pulses through the window to the target for reflection and scattering from the target.

9. The imaging reader of claim 7, wherein the illuminating light assembly includes another energizable illuminating light source for illuminating the target through the window, and wherein the controller is operative for energizing both illuminating light sources to produce the illumination light pulses.

10. The imaging reader of claim 7, wherein the image capture assembly includes an imaging lens for capturing the return light through the window, and for projecting the return light onto the imager to initiate capture of an image of the target.

11. The imaging reader of claim 7, wherein the illumination rate produced by the controller is at least fifty illumination light pulses per second.

12. The imaging reader of claim 7, wherein the frame rate produced by the controller is less than sixty frames per second, and wherein the illumination rate produced by the controller is greater than the frame rate.

13. A method of electro-optically imaging a target, comprising the steps of:
    illuminating the target with illumination light from an energizable illuminating light source in an maging module for return from the target;
    capturing return light from the target with an energizable solid-state imager in the maging module;
    energizing the imager during an exposure time period to capture the return light at a frame rate;
    deenergizing the imager during a non-exposed time period;
    energizing the illuminating light source in the maging module not only during the exposure time period, but also during the non-exposed time period, to produce a plurality of illumination light pulses at an illumination rate that enables the human eye to perceive the illumination light pulses as substantially continuous, the illumination rate of at least one said illumination light pulse produced during the non-exposed time period being substantially independent and decoupled from the frame rate; and
    wherein the illuminating light source is energized during the exposure time period to generate an initial illumination light pulse, and wherein the illuminating light source is energized during the non-exposure time period to generate at least one additional illumination light pulse that successively follows the initial illumination light pulse, wherein both the rising edge and falling edge of the at least one additional illumination light pulse is within said non-exposure time period that is between the exposure time period to generate the initial illumination light pulse and the next exposure time period.

14. The method of claim 13, wherein the illuminating step includes directing the illumination light pulses to the target for reflection and scattering from the target.

15. The method of claim 13, wherein the illuminating step includes illuminating the target with another energizable illuminating light source, and wherein the energizing step is performed by energizing both illuminating light sources to produce the illumination light pulses.

16. The method of claim 13, wherein the illumination rate is at least fifty illumination light pulses per second.

17. The method of claim 13, wherein the frame rate is less than sixty frames per second, and wherein the illumination rate is greater than the frame rate.

* * * * *